Dec. 22, 1964     W. C. GAINES, JR     3,162,209
STEAM TRAP
Filed June 8, 1962
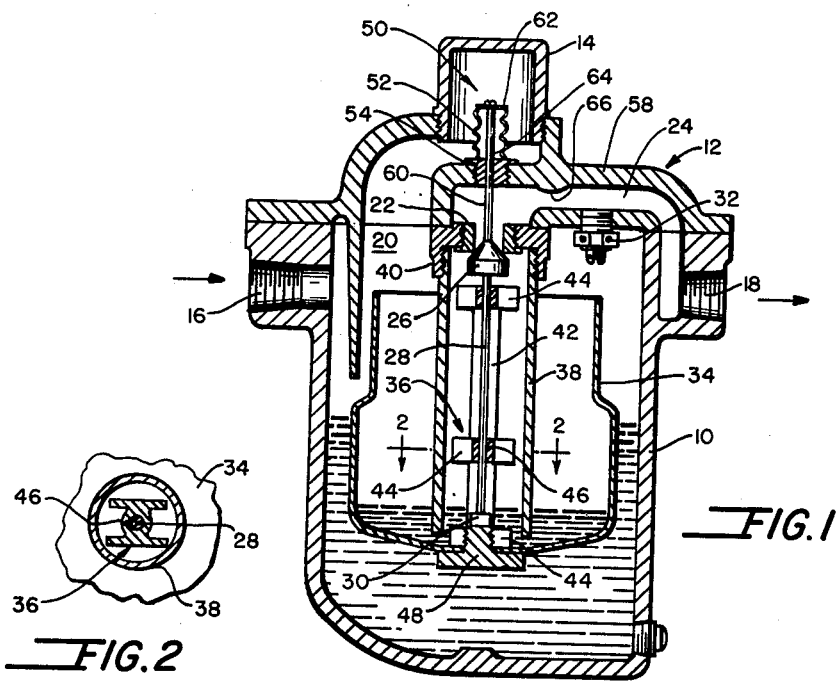
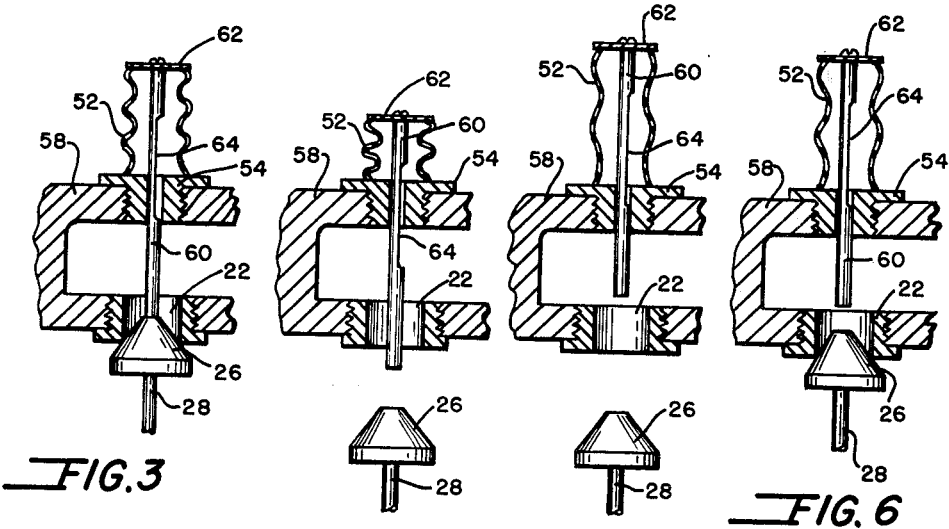
INVENTOR.
WILLIAM C. GAINES
BY
Edward C. Arens
ATTORNEY

United States Patent Office 3,162,209
Patented Dec. 22, 1964

3,162,209
STEAM TRAP
William C. Gaines, Jr., Louisville, Ky., assignor to American Air Filter Company, Inc., Louisville, Ky., a corporation of Delaware
Filed June 8, 1962, Ser. No. 201,122
10 Claims. (Cl. 137—190)

This invention relates to steam traps.

While the principles of the invention are applicable to steam traps of other character, the invention will herein be considered as embodied in upright bucket type traps which operate generally as follows. With the trap empty and the valve therein open, condensate flows into the trap and buoys the bucket up to a point where the valve is forced against its seat by the rising bucket. When the trap accumulates sufficient condensate that it overflows the edge of the bucket, the bucket falls. As the bucket falls, it pulls the valve away from the seat so that the supply pressure acting on the condensate forces it out of the bucket and up through the valve opening. Then, when sufficient condensate has been forced out of the bucket that it is again buoyed up to a certain point, the bucket forces the valve closed.

In choosing a bucket trap to handle an expected maximum condensate rate with a given pressure differential across the trap, economic considerations normally dictate the selection of the smallest trap which will handle the condensate. In that connection, two factors which enter into the rate at which a trap will handle condensate are the pressure differential across the trap and the orifice size of the valve seat. Generally, an increase in either the pressure differential across the trap, or in the valve seat orifice size, results in an increase in the condensate handling capacity of the trap. However, since the force tending to hold the valve closed is the product of the area of the orifice times the pressure differential thereacross, an increase in either results in an increase in that force. If the force holding the valve closed is not overcome by the downward force of the bucket as it falls, the valve will be locked in a closed position. Thus, the selection of a relatively large trap is frequently required for an expected condensate rate simply to obtain a trap which has a bucket heavy enough to overcome the force holding the valve against its seat. While a leverage arrangement may be provided to obtain a multiplied force when the bucket falls or tilts downwardly, certain well known disadvantages exist with such an arrangement.

Thus one object of this invention is the provision of a trap wherein the net pressure differential derived force holding the valve in a closed position is substantially reduced when the valve is about to open so that neither a leverage arrangement, nor a relatively heavy bucket, is required.

Another object of this invention is the provision of a trap having a relatively simple arrangement for imposing a balancing force, proportional to the force holding the valve closed, against the closed valve.

In accordance with the broader aspects of the inveniton, the trap is provided with means responsive to the pressure differential across the valve orifice for exerting a force against the closed valve in an unseating direction. In a specific embodiment, a chamber having a movable wall with an area substantially equal to the area of the valve seat orifice is provided, and the wall is subject on one side to the pressure in the inlet chamber of the trap and on its other side to the pressure in the outlet chamber or passage. A rod attached to the movable wall extends into the outlet passage and bears against the seated valve in an unseating direction with a force proportional to the pressure differential so that the force tending to hold the valve closed is opposed by the force of the rod bearing against the valve in an unseating direction.

Further features of the trap will be explained in some detail in connection with an embodiment incorporating the principles of my invention by way of example and illustrated in the accompanying drawing wherein:

FIGURE 1 is a vertical section illustrating one form of bucket trap according to the invention;

FIGURE 2 is a fragmentary horizontal section taken along the line 2—2 of FIGURE 1; and FIGURES 3-6 are fragmentary sectional views illustrating successive positions of the valve and pressure responsive means during one cycle of trap operation.

Referring to FIGURE 1, the trap casing or body 10, cover 12, and cap 14 form an enclosed vessel into which steam and condensate enter through inlet opening 16, and from which condensate leaves through outlet opening 18.

The interior of the vessel may be considered as being generally divided into an inlet chamber 20 on the inlet or upstream side of the replaceable valve seat 22, and an outlet chamber or passage 24 on the downstream side of the seat. The valve 26 is mounted on the upper end of stem 28 which has an integral enlarged base 30. With valve 26 closed as shown in FIGURE 1, the inlet and outlet chambers are isolated from each other except to the extent that communication is established through thermostatic air vent 32 which allows the escape of air but prevents the passage of steam.

Actuation of the valve 26 from a closed position, wherein it bears against the inlet side of the valve seat orifice, is effected by a falling motion of the upwardly open bucket 34 which, as it falls, pulls a skeletal guide 36 downwardly with it. As the guide falls with the bucket, it strikes the base 30 of the stem 28 with sufficient impact that the valve 26 is jarred away from its seat. After sufficient condensate has been forced out of the bucket up through discharge tube 38, the bucket becomes buoyant and rises. This causes the valve 26 to be seated.

The bucket is guided in its up and down motion by means of the discharge tube 38, and the upright skeletal guide 36 which is centered within the tube 38 and encircles the stem 28 at several vertically spaced points. The tube 38 has its upper end secured within the downwardly open rim 40 of the structure which carries the valve seat 22. The skeletal guide 36 (FIGURES 1 and 2) is comprised of a pair of upright posts 42 on opposite sides of the stem 28, each post having upper, lower, and intermediate horizontally projecting ears 44 which serve to center the guide and stem within the tube. The opposite posts are connected by rings 46 which encircle the stem 28 in loose relation at the levels of the upper and intermediate ears. The guide 36 offers little resistance to the flow of condensate up through the tube 38 because of its skeletal construction. The lower end of the guide is secured to the bucket retaining nut 48 so that the guide and bucket rise and fall as a unit. The bucket retaining nut and base 30 of the stem are not connected, thus permitting the bucket to fall some distance without opening the valve.

In the upper part of the vessel, the cap 14 overlies a space within which a pressure responsive contractible-expansible member in the form of a bellows 50 is situated. The exterior of the bellows is in open communication with the inlet chamber 22 space. The lower edge of the bellows circumferential wall 52 is sealed to the shoulder of a bushing 54 secured in an opening in the upper wall 58 of the outlet passage 24. The axis of this opening is aligned with the axis of the valve seat orifice.

Rod 60, which has its upper end attached to the upper wall 62 of the bellows, extends down through the bushing 54 and into the outlet passage 24 space immediately above the valve 26. The fit of the rod 60 in the bore of bushing 54 is sufficiently loose that the rod is freely movable up and down. In a presently preferred embodiment, one or more longitudinally extending, keyway-shaped slots 64 are provided in the rod for the purpose of controlling communication between the interior of the bellows and the outlet passage 24 in accordance with the vertical position of the rod.

It is here noted that the area of the upper movable wall 62 of the bellows is sized in accordance with the orifice area of the valve seat 22. The wall area is preferably slightly less than the orifice area so that with the pressure differential to which both wall 62 and valve 26 are subject being equal, the force holding the valve closed slightly exceeds the downward force of the wall. The length of rod 60 is such that when the bellows is contracted a predetermined amount, the bottom end of the rod will bear against the upper surface of closed valve 26 in an unseating direction. It will be appreciated that the normal at rest position of the bellows with no pressure differential across it is such that the bellows would be in a somewhat more extended condition than shown in FIGURE 1.

Trap operation will be explained first in connection with FIGURE 1. Assuming the illustrated levels of condensate in the trap shown in FIGURE 1, the buoyant bucket holds valve 26 tightly against its seat 22. The valve is also held against its seat by the net upward force due to the pressure differential across the valve less the downward force of the rod 60. When sufficient additional condensate accumulates in the trap that it overflows into the bucket, the bucket begins to drop independently of the valve 26 which remains closed. Thus during the initial part of the fall of the bucket, the guide 36 will slide on the valve stem and the bucket retaining nut 48 will move away from the base 30 of the valve stem 28. As the bucket and attached skeletal guide fall, the intermediate ring 46 of the guide will strike the base 30 of the valve stem so that the valve 26 is snapped away from its seat and drops to the bottom of the trap along with the bucket. With the bucket, guide, and valve down, condensate is forced, by the differential in pressure between the inlet chamber 20 and outlet passage 24, up the discharge tube 38, through the valve seat orifice, and out through the outlet passage 24. The members will remain down with the valve wide open so long as sufficient condensate is entering the trap to continue the overflow into the bucket. When the condensate rate decreases sufficiently that condensate is being forced out of the bucket and up the discharge tube faster than it is entering the trap, the bucket will again become buoyant and rise. The valve is carried upwardly with the bucket, and is snapped shut by the velocity of the discharging condensate as it nears its seat. The explanation thus far has, for the most part, ignored the effect upon operation of the pressure responsive bellows. This aspect will now be considered in connection with FIGURES 3-6 which illustrate successive positions of the valve, and the pressure responsive means, during a cycle.

FIGURE 3 corresponds to the position of the valve 26, bellows 50 and rod 60 just before the bucket begins to fall. It is noted that the slot 64 on the rod has its lower end slightly above the lower edge of the bushing 54 so that communication between the interior of the bellows and the outlet passage 24 is somewhat more restricted than if the lower end of the slot were below the lower edge of the bushing. During this period just before the bucket drops, the pressure difference between the inside and outside of the bellows is substantially the same as the pressure difference between the inlet chamber and the outlet passage. Consequently the downward force of the rod is approximately equal to this pressure difference times the area of the upper wall 62 of the bellows, and this downward force against the closed valve is only slightly less than the upward force of the valve 26. Thus the valve remains closed until the bucket falls and, by impact of the guide against the base 30 of the valve stem, pulls the valve away from the seat, as previously described.

When this occurs, the resistance to downward movement of the rod 60 and the upper wall of the bellows is momentarily removed and these members will then move downwardly as the bellows contracts so that the bottom end of the rod extends into the valve seat orifice. However, this depressed rod position also results in a portion of the slot 64 extending into the outlet passage 24 (FIGURE 4) so that communication between the bellows interior and outlet passage is increased. As condensate is discharged through the valve seat orifice into the outlet passage the difference in pressure between the inlet chamber and the outlet passage is substantially reduced. With the slot 64 disposed as shown in FIGURE 4, so that communication between the outlet passage and the interior of the bellows is relatively open, the pressure in the bellows interior will increase and the bellows will be expanded so that its upper wall 62 moves upwardly toward its at-rest position as shown in FIGURE 5 wherein there is little, if any, pressure differential across the bellows. This upward movement of the wall 62 and rod causes the lower end of the rod to be moved upwardly out of the valve seat orifice so that when the valve 26 closes, it will be able to seat in a snap acting manner without interference from the rod. It will be observed that as the rod rises, the slot 64 is retracted so that communication between the interior of the bellows and outlet passage is again restricted before the valve closes.

In FIGURE 6 the valve 26 has been seated by the rise of the bucket and the pressure difference across the valve. The pressure within the bellows is less than in the inlet chamber but greater than in the outlet passage. However, the pressure in the bellows decreases by leakage around the rod into the outlet passage so that after a time the pressure in the bellows and outlet passage will be equal and the rod will have gradually descended until its lower end gently meets, and then gradually bears with increasing force against, the valve. This gradual descent avoids jarring the seated valve from a closed position and avoids damaging the valve head. The FIGURE 3 condition thus attained will be maintained until the increase in condensate in the trap causes the bucket to drop again and another condensate discharge cycle occurs.

In certain cases it may be desirable to insure that the bellows expands quickly after the valve opens. To facilitate the quick expansion, a small obstruction 66 may be provided in the outlet passage. The obstruction will cause a more rapid increase in pressure in the outlet passage upstream of the obstruction when the valve first opens.

While a preferred embodiment of the invention has been described, it will be appreciated that numerous details of construction may be varied within the scope of the invention. As examples, the contractible-expansible chamber may take other forms than the illustrated bellows, and the selective communication obtained with slot 64 in the rod may not be required in certain cases. Further the relationship between the area of the valve seat orifice and the upper wall 62 can be varied to some degree, it only being required that the downward force of the bucket plus the downward force of the rod exceed the upward force of the valve when the bucket falls.

It is also noted that the valve seat 22, and bushing 54 to which the bellows is connected, are not integral parts of the trap. Thus different sizes of these parts may be employed in a given size trap to handle different condensate rates under various pressure conditions.

The invention claimed is:
1. In a steam trap:
(a) a casing having an inlet and an outlet including means dividing the casing interior into an inlet chamber and an outlet passage on opposite sides of a valve seat;

(b) a single valve adapted to seat against the inlet chamber side of said seat;

(c) float means operatively connected to said valve to actuate said valve in accordance with the quantity of condensate in said casing;

(d) a bellows having its exterior and interior subject to the pressure in said inlet chamber and said outlet passage respectively, and including a movable wall carrying rod means operable to exert force against said valve in a valve unseating direction, when said valve is closed, proportional to the difference in pressure across said movable wall, said rod means being unattached to said valve to permit its independent positioning after said valve has been unseated.

2. In the steam trap specified in claim 1:

(a) the exterior of said bellows chamber is in substantially open communciation with said inlet chamber, and the interior of said bellows chamber is in relatively restricted communication with said outlet passage.

3. In a steam trap:

(a) a casing having an inlet and an outlet and including means dividing the interior into an inlet chamber and an outlet passage on opposite sides of a valve seat;

(b) a single valve adapted to seat against the inlet chamber side of said seat;

(c) a bucket in said inlet chamber operative to seat said valve during the rise of said bucket, and unseat said valve during the fall of said bucket;

(d) an expansible-contractible chamber including a movable wall having an area substantially equal to the open area of said valve seat, said wall communicting with the inlet and outlet chambers respectively on opposite sides thereof so as to be responsive to the difference in pressure between said inlet chamber and said outlet passage;

(e) means attached to said wall for movement therewith and disposed to bear against said valve in an unseating direction, when said valve is seated, with a force proportional to said difference in pressure between said inlet chamber and said outlet passage so that the force tending to hold said valve closed is substantially balanced by the force of said means bearing against said valve in an unseating direction, said means being unconnected to said valve to permit positioning of said means in accordance with said difference in pressure and independently of said valve position after unseating of said valve.

4. In a bucket type steam trap:

(a) a casing including means dividing the interior thereof into an inlet chamber and an outlet passage on opposite sides of a valve orifice;

(b) a single valve adapted to seat against the inlet chamber side of said orifice;

(c) a bucket for actuaing said valve;

(d) a pressure responsive expansible chamber axially aligned with the axis of said valve and including a movable wall separating said inlet chamber from the interior of said pressure responsive chamber, and further including an apertured wall separating said outlet passage from the interior of said pressure responsive chamber and restricting communication therebetween; and (e) a rod secured to said movable wall and extending through said aperture wall to bear in unsecured relation against said valve in an unseating direction when said valve is closed and the differential pressure to which said movable wall is subject exceeds a predetermined value.

5. In the steam trap specified in claim 4:

(a) the net area of said wall subject to said differential pressure is less than the area of said valve orifice.

6. In the steam trap specified in claim 4:

(a) said rod includes a reduced cross-sectional area along a portion of its length movable into and out of said outlet passage during a cycle of operation of said trap to vary the restricted communication between said outlet passage and the interior of said pressure responsive chamber in accordance with the position of said rod relative to said apertured wall.

7. In a steam trap:

(a) a casing having an inlet and an outlet and including means dividing the casing interior into an inlet chamber and an outlet passage on opposite sides of a valve seat;

(b) a single valve adapted to seat against the inlet chamber side of said seat;

(c) an upright bucket operatively connected to said valve to open and close said valve in accordance with the level of condensate in said casing; and (d) means for exerting a force against said valve in an unseating direction when said valve is closed including a pressure responsive movable wall having one side in open communication with said inlet chamber and an opposite side in selective communication with said outlet passage in accordance with the position of said movable wall, said means being in unsecured relation to said valve to permit it to assume positions independently of the positioning of said valve.

8. In the steam trap specified in claim 7:

(a) said force exerting means includes rod means attached to said movable wall for movement toward and away from said valve in accordance with variations in pressure across said movable wall.

9. In the steam trap specified in claim 8:

(a) said rod means includes slot means extending for that portion of the length of said rod means extendible into, and retractible from, said outlet passage to vary said selective communication between said outlet passage and said opposite side of said movable wall.

10. In the steam trap specified in claim 9:

(a) said outlet passage includes flow obstructing means therein for increasing the pressure in said passage upstream from said obstructing means during discharge of condensate.

References Cited in the file of this patent

UNITED STATES PATENTS

| 508,727 | Leitch | Nov 14, 1893 |
| 759,131 | Rowinsky | May 3, 1904 |
| 1,576,648 | Gagnon | Mar. 16, 1926 |

FOREIGN PATENTS

| 2,318 | Great Britain | of 1884 |
| 389,614 | Great Britain | Mar. 23, 1933 |